A. E. REUSS & O. SCHNITZLER.
SPEED CHANGING MECHANISM.
APPLICATION FILED OCT. 18, 1911.
1,060,707.
Patented May 6, 1913.
4 SHEETS—SHEET 1.
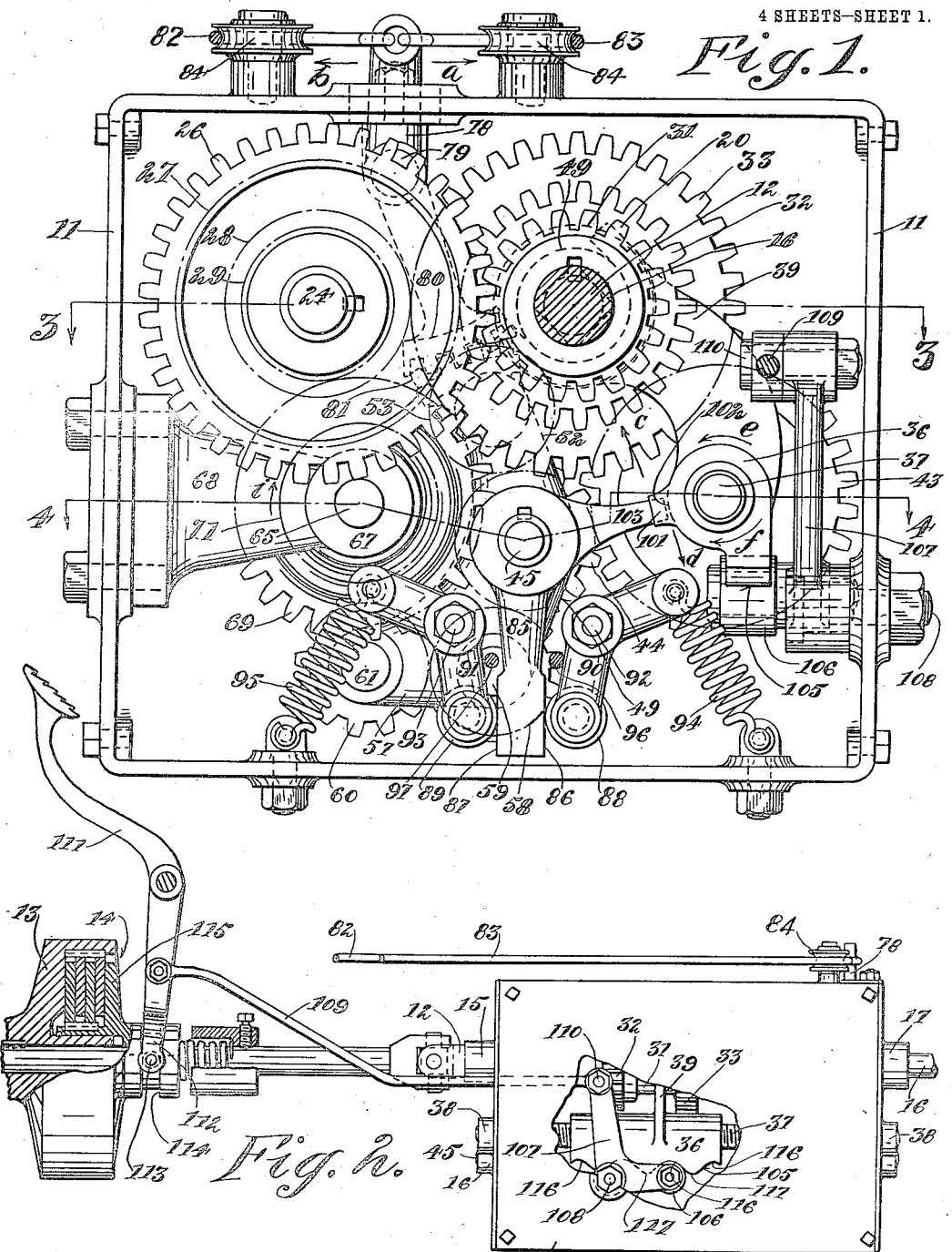

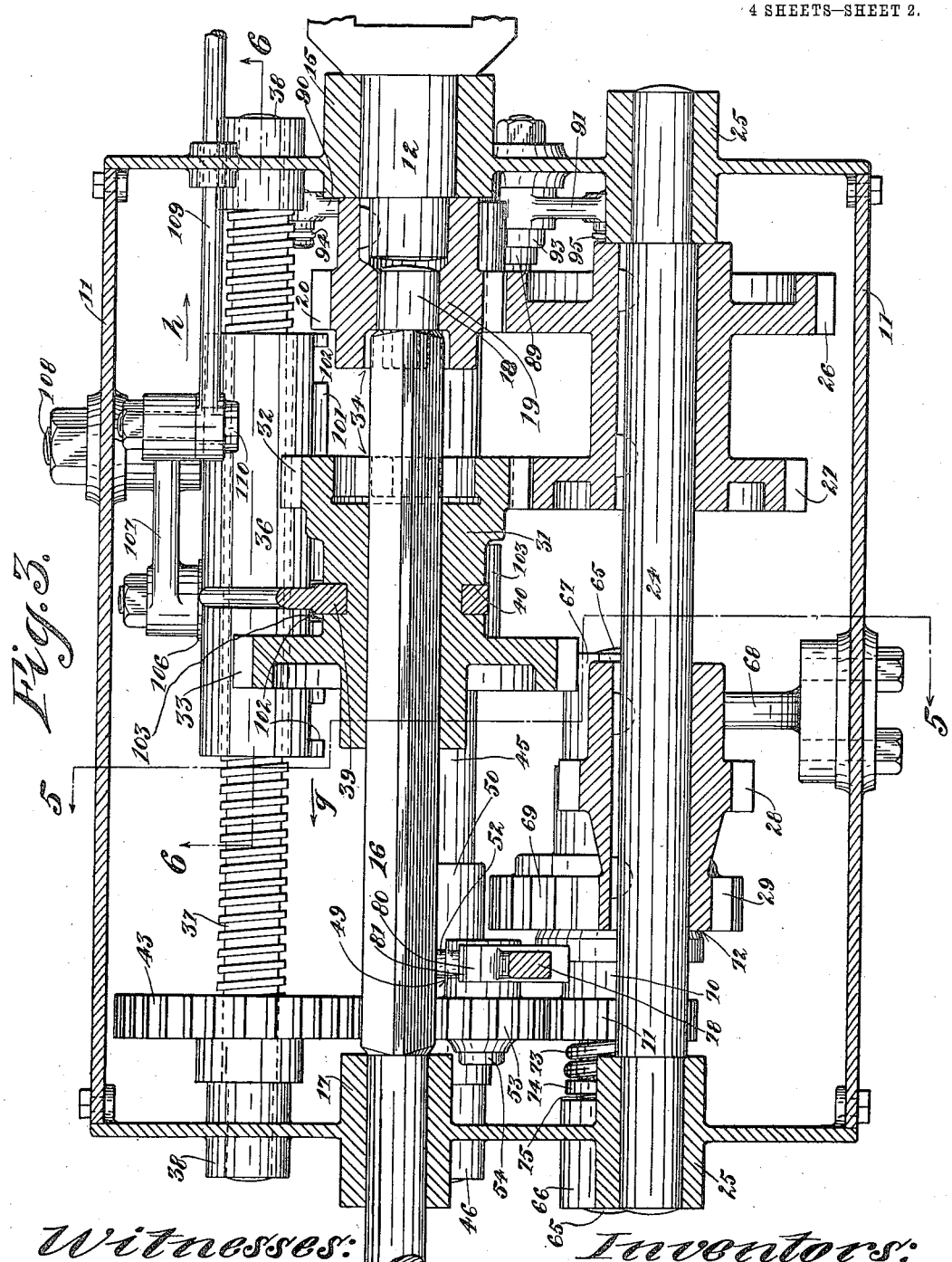

A. E. REUSS & O. SCHNITZLER.
SPEED CHANGING MECHANISM.
APPLICATION FILED OCT. 18, 1911.
1,060,707.
Patented May 6, 1913.
4 SHEETS—SHEET 3.
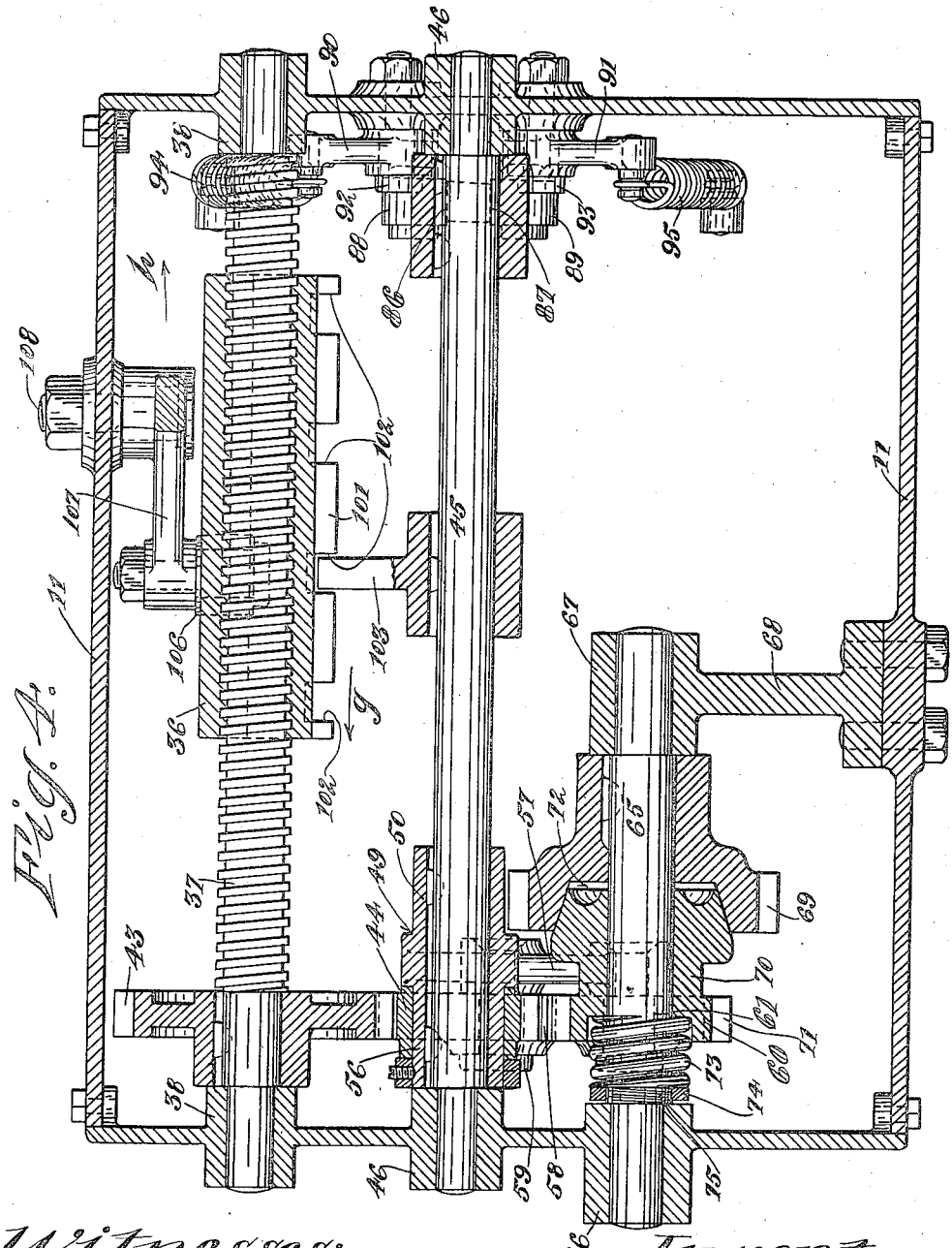

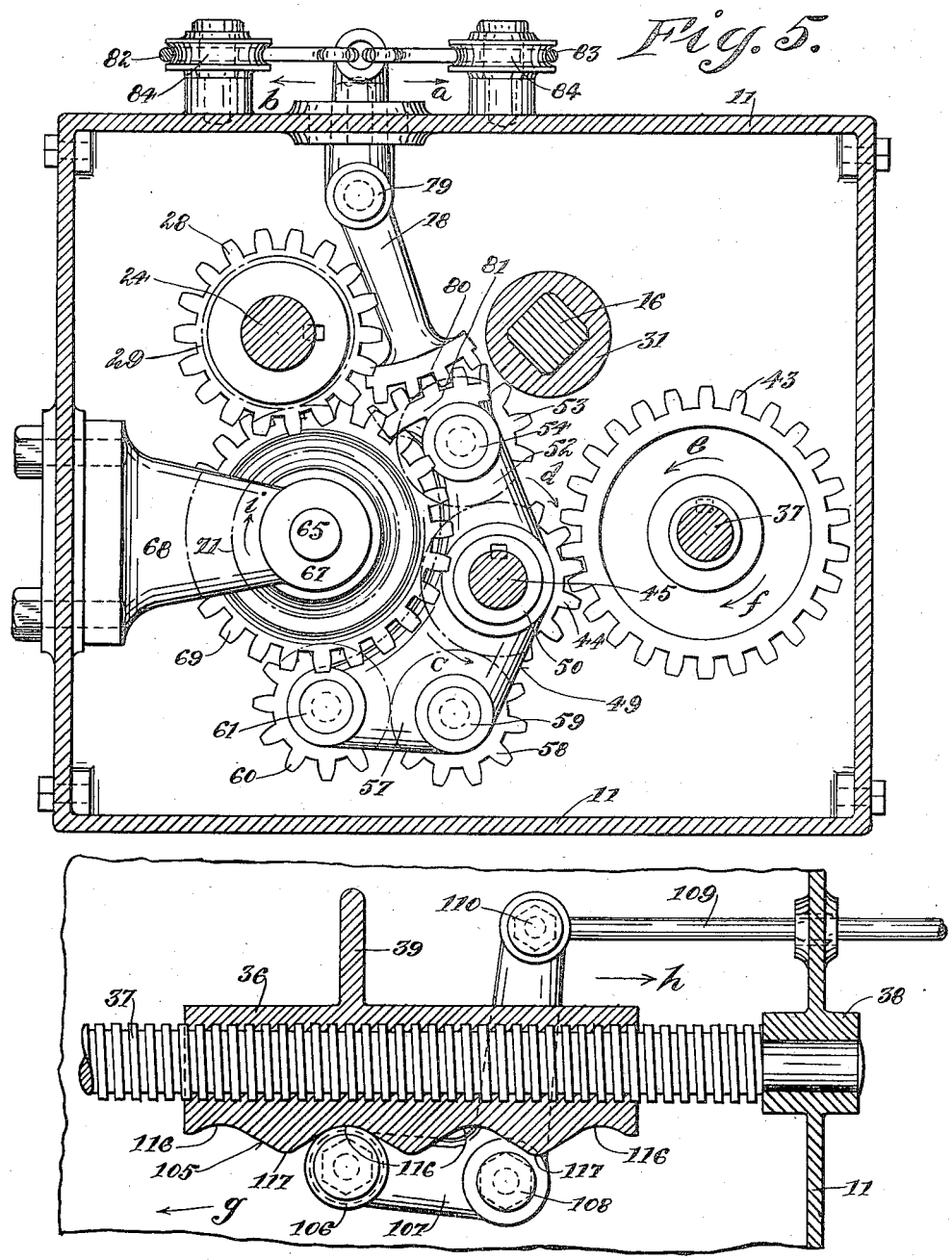

UNITED STATES PATENT OFFICE.

ARTHUR E. REUSS, OF CINCINNATI, AND OSCAR SCHNITZLER, OF REMINGTON, OHIO.

SPEED-CHANGING MECHANISM.

1,060,707.   Specification of Letters Patent.   Patented May 6, 1913.

Application filed October 18, 1911. Serial No. 655,331.

*To all whom it may concern:*

Be it known that we, ARTHUR E. REUSS and OSCAR SCHNITZLER, citizens of the United States, residing, respectively, at Cincinnati and at Remington, in the county of Hamilton and State of Ohio, have jointly invented certain new and useful Improvements in Speed-Changing Mechanism, of which the following is a specification.

Our invention relates to speed changing mechanism, and it is the object of our invention to provide novel means whereby the changing relation in the speed changing elements may be effected by power means having connection with one of the elements of the power transmission mechanism for moving the same; further to provide novel means for moving the movable member of power transmitting mechanism, embracing a screw-rod and shifter, and novel mechanism for locking said movable member; further to provide novel means for initiating shifting movement in the speed change mechanism embracing a controlling member having operative connection with a suitable controlling device; and further to provide resilient positioning means whereby the moving means for the movable member are normally held in inactive relation, and the locking means for the shifting member are normally held in locked relation.

The invention will be further readily understood from the following description and claims, and from the drawings, in which latter:

Figure 1 is an end elevation of our improved device, with the end of the casing removed. Fig. 2 is a side elevation of our improved device showing its clutch connections and showing the casing partly broken away, and the clutch shown partly in axial section. Fig. 3 is a longitudinal section of our improved device taken in the axial planes of the driving and driven shafts and the intermediate shaft, on a line corresponding to the section line 3—3 of Fig. 1. Fig. 4 is a longitudinal section of the same taken on a line corresponding to the irregular line 4—4 of Fig. 1. Fig. 5 is a cross-section of our improved device taken on a line corresponding to the line 5—5 of Fig. 3; and, Fig. 6 is a longitudinal section taken in the axial plane of the shifting screw on the line 6—6 of Fig. 3.

The present exemplification of our invention illustrates power operated means for shifting the movable member of the speed-change gearing, and initiating means for positioning said power operated mechanism in operative relation. The initiation for transmitting relation in the power operated shifting means may be effected by a suitable controlling mechanism, such, for instance, as shown, described and claimed in our co-pending applications, Serial No. 630,094, filed May 29, 1911, and Serial No. 654,610, filed October 14, 1911.

11 represents the casing of our improved device.

12 represents the drive-shaft which may have operative connection with a suitable source of power, as with the internal combustion motor or other motor of a traveling vehicle, such as an automobile. The usual crank-shaft of the motor may be provided with a fly-wheel 13 connected with the drive-shaft by a main drive-clutch 14. The drive-shaft is shown journaled in a bearing 15 of the casing.

16 is the driven shaft journaled in a bearing 17 of the casing. The adjacent ends of the shafts 12 and 16 may have journal support with each other as shown by the journal stub 18 of the driven shaft received in the bearing 19 formed in a gear 20, secured to the drive-shaft.

24 is an intermediate shaft journaled in bearings 25 of the casing. It has a gear 26 thereon which meshes with the gear 20 for driving said intermediate shaft from the drive-shaft. In the present exemplification further, the intermediate shaft has gears 27, 28, 29, fast thereon.

31 is a gear-sleeve which is slidable lengthwise but rotates with the driven shaft, as by forming the latter polygonal in cross-section and providing a similarly formed bore for the gear-sleeve. The gear-sleeve has gears 32 and 33 thereon. It also has one member of a clutch 34 at its end, the other member whereof is shown on the gear 20. When said clutch is in engagement, direct transmission takes place between the drive-shaft and the driven shaft, preferably for the transmission of high speed. If intermediate speed transmission is desired the gear sleeve is shifted longitudinally for causing its gear 32 to mesh with the gear 27, when transmission takes place from the drive-shaft through the gears 20, 26, 27 and 32 to the driven shaft. If low speed transmission is desired, the gear-sleeve is shifted still further longitudinally for causing its gear 33 to mesh with the gear 28 on the intermediate shaft, the transmission then taking place through the gears 20, 26, 28 and 33 to the driven shaft. Change in speed transmission may take place in increasing or decreasing speed ratio by shifting said gear-sleeve to the left or to the right as may be desired.

The gear-sleeve is the movable member of the power transmitting mechanism in the present exemplification of our invention. It is obvious that other forms of power transmitting mechanism embracing a movable member for accomplishing a change in speed transmission may be employed without departing from the spirit of our invention.

36 is a shifter for shifting the gear-sleeve and has threaded connection with a screw-rod 37 journaled in bearings 38 in the casing. It is provided with a fork 39 received in an annular groove 40 of the gear-sleeve, by which connection the shifter is also positioned against turning with relation to the screw, the shifter being moved longitudinally on the screw in either direction by the turning of the screw in reverse directions for shifting the gear-sleeve lengthwise on the shaft 16. For turning the screw-rod we secure a gear 43 thereto, which is meshed by a gear 44 on a shaft 45 journaled in bearings 46 in the casing.

49 is a tumbler-plate having a bearing 50 on the shaft 45, which in the present instance is a rock-shaft, the tumbler-plate being secured thereto. One arm 52 on the tumbler-plate has a gear 53 journaled thereon on a stud 54. The gear 53 meshes with the gear 44, the latter being journaled on a stud-sleeve 56 of the tumbler-arm for permitting rotation thereof about the axis of the rock-shaft 45. The other arm 57 of the tumbler-plate has a gear 58 journaled thereon on a stud 59 which meshes with the gear 44 and a gear 60 journaled thereon on a stud 61, the gear 60 meshing with the gear 58.

65 is a shaft journaled in a bearing 66 of the casing and in a bearing 67 on a pedestal 68 in said casing. This shaft carries a gear 69 fast thereon driven by the gear 29. 70 is a clutch-sleeve longitudinally movable on said shaft 65 and having a gear 71 thereon. There is a clutch 72 between the gear 69 and the sleeve 70, shown as a cup friction-clutch, engagement of which is urged by a spring 73 between said sleeve and a nut 74 adjustably received about the threaded end 75 of the shaft 65. The spring urges the friction-clutch 72 into engagement for yieldingly transmitting motion from the gear 69 to the gear 71, so that upon a given resistance being exerted upon said clutch from the gear 71, the said clutch will yield and thereby prevent damage or breakage of parts actuated by the gear 71. The gears 53 and 60 of the tumbler gearing are arranged to be selectively engaged with the gear 71 for rotating the gear 44 in opposite directions.

Suitable mechanism may be provided for swinging the tumbler mechanism about its rocking axis which may be effected by a speed-change initiating member, shown as an initiating arm 78 pivoted at 79 to the casing and provided with a segmental rack 80 meshing with the segmental rack 81 on the tumbler-arm. This speed-change initiating member may have suitable connection with a suitable controlling device such for instance as shown in our aforesaid applications, these connections being exemplified by the connections 82, 83. These connections may be received about idler rollers 84, 84, on the casing. When said arm is moved in the direction of the arrow $a$, the screw-rod will be rotated in one direction for instance for accomplishing a change in decreasing speed ratio for instance from high to low, and when said arm is moved in the direction of the arrow $b$, a change in increasing speed ratio is initiated for instance from low to high, these changes taking place step by step in sequential order in either increasing or decreasing speed ratio.

We provide means for maintaining the tumbler-arm in neutral or non-transmitting relation and preferably provide yielding mechanism for the purpose, so that the tumbler gearing may be engaged for turning the screw-rod in either direction and for returning the tumbler gearing to normal or neutral position when said screw-rod has been turned sufficiently for a change of speed. Thus we provide the tumbler shaft 45 with an arm 85 having contact-faces 86, 87, thereon arranged to be engaged by contact-rollers 88, 89, on levers 90, 91, pivoted to the casing on studs 92, 93, springs 94, 95, normally urging said rollers toward said arm for maintaining the same normally in neutral position.

96, 97, are stops on the wall of the casing, these stops being arranged to limit the movements of the levers 90, 91, toward the arm 85 for positioning the latter.

Means are provided for locking the shifter in its various positions when the movable member of the power transmitting mechanism is in proper position for power transmission at a given speed. Thus the shifter is provided with a ridge 101 having a series of recesses 102 therein. The rock-shaft 45 is provided with a finger 103 arranged to coact with said recesses for being received therein when said movable member is in power transmitting position. The finger is secured to the rock-shaft 45 and rocks therewith. The resilient positioning means for the rock-shaft exemplified by the arm 85 and levers 90, 91, also act to maintain the finger or keeper of the locking mechanism normally in locked relation. If a change in speed is to be effected, movement of the initiating arm 78 is effected in one direction or the other. If this movement is effected in the direction of the arrow *a*, the keeper will move in the direction of the arrow *c*, the tumbler-arm rocking in the same direction for causing engagement of the gear 53 thereon with the gear 71, rotating the screw-rod in the direction of the arrow *e*, and causing shifting of the shifter and the gear-sleeve in the direction of the arrow *g*. As soon as meshing relation has been accomplished between the gear 53 and the gear 71 and the keeper has been moved out of range of the walls of its aperture, the screw-rod will begin rotating for shifting the shifter longitudinally thereof.

The keeper will be maintained in its assumed position by the ridge 101 for maintaining meshing relation between the gears 53 and 71 until the next recess on said shifter comes opposite said keeper, whereupon the keeper will snap into said recess, owing to the action of the spring 94, the tumbler-arm simultaneously moving into neutral position. If on the other hand, said initiating arm is moved in the direction of the arrow *b*, the tumbler-arm and keeper will be moved in the direction of the arrow *d*, for engaging the tumbler-gear 60 with the gear 71 and rotating said screw-rod in the direction of the arrow *f* and moving the shifter and the gear-sleeve in the direction of the arrow *h*. It is assumed that the gear 71 rotates in the direction of the arrow *i*. Momentum of the parts will complete the change.

The shifter is provided with a scalloped face 105 with which a contact-part shown as a roller 106 coacts, the roller being on a lever 107 pivoted to the casing on a stud 108 and having a connection 109 articulated therewith at 110, the said connection leading to a treadle-lever 111 having a fork 112 provided with a pin or pins 113, received in an annular groove 114 in the releasable member 115 of the main drive-clutch 14. When a change of speed is being effected, the main drive-clutch is released by having the roller 106 move out of one of the depressions 116 of the scalloped face 105 up one of the elevations 117 of said scalloped face, whereby the driving force of the motor is released from the power transmitting gearing during change of speed thereof for permitting ease in change of speed relation. Reversal of power transmitting movement may be effected in our improved device by shifting the shifter one more step beyond the position for low-speed transmission for bringing the gear 33 into mesh with the gear 69.

Having thus fully described our invention, what we claim as new and desire to secure by Letters Patent is:

1. In speed changing mechanism, the combination of power transmitting mechanism comprising a movable member employed in changing the speed of transmission thereof, a main drive-clutch, and means for moving said movable member comprising a screw-rod and a shifter having threaded connection with said screw-rod, said shifter having operative connection with said movable member for moving the same and operative connection with said main drive-clutch for releasing the same.

2. In speed changing mechanism, the combination of power transmitting mechanism comprising a movable member employed in changing the speed of transmission thereof, and means for moving said movable member comprising a screw-rod, a shifter having threaded connection with said screw-rod, a gear for rotating said screw-rod, tumbler gearing comprising gears for rotating said gear in reverse directions, and connecting means between said tumbler gearing and an element of said power transmitting mechanism for rotating said tumbler gearing.

3. In speed changing mechanism, the combination of power transmitting mechanism embracing a movable member employed in changing the speed of transmission thereof, and means for shifting said movable member comprising a screw-rod, a shifter having threaded connection with said screw-rod, a gear for rotating said screw-rod, and tumbler gearing comprising gears for rotating said gear in reverse directions, and yielding driving means between said tumbler gearing and a member of said power transmitting mechanism.

4. In speed changing mechanism, the combination of power transmitting mechanism comprising a movable member employed in changing the speed of transmission thereof, and means for shifting said movable member comprising a screw-rod, a shifter having threaded connection with said screw-rod, and means for rotating said screw-rod in opposite directions, and a lock for said shifter, said lock comprising a keeper operable upon the operation of said last-named means in either direction.

5. In speed changing mechanism, the combination of power transmitting mechanism comprising a movable member employed in changing the speed of transmission thereof, and means for shifting said movable member comprising a screw-rod, a shifter having threaded connection with said screw-rod, and means for rotating said screw-rod in opposite directions, a lock for said shifter, said lock comprising a keeper operable upon the operation of said last-named means in either direction, and means for normally locating said keeper in engagement with said shifter.

6. In speed changing mechanism, the combination of power transmitting mechanism comprising a movable member employed in changing the speed of transmission thereof, and means for shifting said movable member comprising a screw-rod, a shifter having threaded connection with said screw-rod and positioning connection with said movable-member, a gear for rotating said screw-rod, and tumbler gearing comprising gears rotatable in opposite directions for rotating said gear in reverse directions, a lock for said shifter comprising a keeper swingable with said tumbler gearing for disengaging said shifter; and resilient means for returning said keeper into engaging position with said shifter.

7. In speed changing mechanism, the combination of power transmitting mechanism comprising a movable member employed in changing the speed of transmission thereof, and means for shifting said movable member comprising a screw-rod, a shifter having threaded connection with said screw-rod, a gear for rotating said screw-rod, and tumbler gearing comprising gears arranged to coact with said last-named gear for rotating said screw-rod in reverse directions, and resilient means for normally maintaining said tumbler gearing in inactive relation.

8. In speed changing mechanism, the combination of power transmitting mechanism comprising a movable member employed in changing the speed of transmission thereof, and means for shifting said movable member comprising a screw-rod, a shifter having threaded connection with said screw-rod, a gear for rotating said screw-rod, and tumbler gearing comprising gears arranged to coact with said last-named gear for rotating said screw-rod in reverse directions, resilient means for normally maintaining said tumbler gearing in inactive relation, and stops for limiting the reverse movements of said tumbler gearing.

9. In speed changing mechanism, the combination of power transmitting mechanism comprising a movable member employed in changing the speed of transmission thereof, and means for shifting said movable member comprising a screw-rod, a shifter having threaded connection with said screw-rod, a gear for rotating said screw-rod, and tumbler gearing comprising gears arranged to coact with said last-named gear for rotating said screw-rod in reverse directions, resilient means for normally maintaining said tumbler gearing in inactive relation, and a lock for said shifter, said lock comprising a keeper normally held in engagement with said shifter by said resilient means.

10. In speed changing mechanism, the combination of power transmitting mechanism comprising a movable member employed in changing the speed of transmission thereof, and means for shifting said movable member comprising a shifter and tumbler gearing for operating said shifter in reverse directions, a lock for said shifter comprising a keeper having operative connection with said reversing gearing, and resilient means for normally maintaining said reversing gearing in inactive relation and said keeper in locking relation.

11. In speed changing mechanism, the combination of power transmitting mechanism comprising a movable member employed in changing the speed of transmission thereof, and means for shifting said movable member comprising a shifter and tumbler gearing for operating said shifter in reverse directions, a lock for said shifter comprising a keeper having operative connection with said reversing gearing, resilient means for normally maintaining said reversing gearing in inactive relation and said keeper in locking relation, and a controlled member for oscillating said reversing gearing and keeper.

12. In speed changing mechanism, the combination of power transmitting mechanism comprising a movable member employed in changing the speed of transmission thereof, means for shifting said movable member embracing a screw-rod, a shifter having threaded connection with said screw-rod, a gear for rotating said screw-rod, and tumbler gearing coacting therewith and embracing gears for rotating said screw-rod in reverse directions, a lock for said shifter comprising a keeper having operative connection with said tumbler gearing, and a controlled member having operative connection with said tumbler gearing for moving said tumbler gearing and keeper.

13. In speed changing mechanism, the combination of power transmitting mechanism comprising a movable member employed in changing the speed of transmission thereof, and means for shifting said movable member comprising a screw-rod, a shifter having threaded connection with said screw-rod, a gear for rotating said screw-rod, and tumbler gearing coacting therewith and comprising gears for rotating said screw-rod in reverse directions, a lock for said shifter comprising a keeper having operative connection with said tumbler gearing, a controlled member having operative connection with said last-named connection for moving said tumbler gearing and keeper, and resilient means for normally holding said tumbler gearing in inactive relation and said keeper in locking relation with said shifter.

14. In speed changing mechanism, the combination of power transmitting mechanism comprising a movable member employed in changing the speed of transmission thereof, and means for shifting said movable member comprising a shifter having positioning connection with said movable member, and means for moving said shifter in reverse directions, a lock for said shifter comprising a keeper connected with said last-named means for operating the same, and said lock comprising coacting means for said keeper arranged longitudinally of said shifter, and means for normally moving said keeper into locking relation with said last-named means.

15. In speed changing mechanism, the combination of power transmitting mechanism comprising a movable member employed in changing the speed of transmission thereof, a drive-clutch, and means for shifting said movable member comprising a screw-rod and a shifter having threaded connection with said screw-rod and extending longitudinally of the latter and provided with a scalloped face, actuating means for said drive-clutch provided with coacting contact means for said scalloped face, a lock for said shifter comprising a series of recesses arranged longitudinally of said shifter and a keeper arranged to coact with said recesses, and means for driving said screw-rod in reverse directions having operative connection with said keeper for shifting the same out of said recesses.

16. In speed changing mechanism, the combination of power transmitting mechanism comprising a movable member employed in changing the speed of transmission thereof, a drive-clutch, and means for shifting said movable member comprising a screw-rod, rotating means for said screw-rod, and a shifter having threaded connection with said screw-rod and extending longitudinally of the latter and provided with a scalloped face, actuating means for said drive-clutch provided with coacting contact means for said scalloped face, a lock for said shifter comprising a series of recesses arranged longitudinally of said shifter and a keeper arranged to coact with said recesses, and means for driving said screw-rod in reverse directions having operative connection with said keeper for shifting the same out of said recesses, and resilient means for maintaining said rotating means for said screw-rod in inactive relation and said keeper in locking relation.

17. In speed changing mechanism, the combination of power transmitting mechanism comprising speed-change and reversing elements comprising a movable member, and means for shifting said movable member comprising a screw-rod, a shifter having threaded connection with said screw-rod, a gear for rotating said screw-rod, and yielding driving means for the latter comprising one of said reversing elements.

In testimony whereof, we have signed our names hereto in the presence of two subscribing witnesses.

ARTHUR E. REUSS.
OSCAR SCHNITZLER.

Witnesses:
EDWARD SOUTHWORTH,
THERESA SILBER.